(12) United States Patent
Chen et al.

(10) Patent No.: US 10,366,249 B2
(45) Date of Patent: Jul. 30, 2019

(54) SYSTEM AND METHOD FOR PRIVACY MANAGEMENT OF INFINITE DATA STREAMS

(71) Applicant: Samsung Electronics Co., Ltd, Suwon-si (KR)

(72) Inventors: Rui Chen, Mountain View, CA (US);
Yilin Shen, Mountain View, CA (US);
Hongxia Jin, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 54 days.

(21) Appl. No.: 15/294,570

(22) Filed: Oct. 14, 2016

(65) Prior Publication Data

US 2017/0109544 A1 Apr. 20, 2017

Related U.S. Application Data

(60) Provisional application No. 62/241,632, filed on Oct. 14, 2015.

(51) Int. Cl.
*G06F 21/62* (2013.01)
*H04L 29/06* (2006.01)

(52) U.S. Cl.
CPC ...... *G06F 21/6254* (2013.01); *H04L 63/0421* (2013.01); *G06F 21/6245* (2013.01); *H04L 63/0407* (2013.01)

(58) Field of Classification Search
CPC .......... G06F 21/6254; H04L 63/0407; H04L 63/0421
See application file for complete search history.

(56) References Cited

U.S. PATENT DOCUMENTS 6,904,110 B2 6/2005 Trans et al.
7,512,980 B2 3/2009 Copeland et al.
(Continued)

FOREIGN PATENT DOCUMENTS

WO 2015026386 A1 2/2015

OTHER PUBLICATIONS

Dwork, C., et al., "The Algorithmic Foundations of Differential Privacy," Foundations and Trends® in Theoretical Computer Science, vol. 9, Nos. 3-4, DOI: 10.1561/0400000042, 2014, 281 pages.
(Continued)

*Primary Examiner* — Ellen Tran (57) ABSTRACT

An apparatus, method, and computer readable medium for management of infinite data streams. The apparatus includes a memory that stores streaming data with a data set and a processor operably connected to the memory. The processor transforms the data set to a second data set. To transform the data set, the processor determines whether a difference level exceeds a threshold, and transforms the data set by adding a noise when the difference level exceeds the threshold. When the difference level does not exceed the threshold, the processor determines whether a retroactive count is greater than a threshold, transforms the data set by adding a second noise when the retroactive count is greater than the threshold, and transforms the data set by adding a third noise when the retroactive count is not greater than the threshold. The processor transmits the second data set to a data processing system for further processing.

20 Claims, 9 Drawing Sheets

(56) References Cited

U.S. PATENT DOCUMENTS

| | | |
|---|---|---|
| 7,605,940 B2 | 10/2009 | Silverbrook et al. |
| 8,281,121 B2 | 10/2012 | Nath et al. |
| 8,416,468 B2 | 4/2013 | Underwood et al. |
| 8,468,244 B2 | 6/2013 | Redlich et al. |
| 8,555,400 B2 | 10/2013 | Shi et al. |
| 8,909,711 B1 * | 12/2014 | Staddon ................ G06Q 50/01 709/204 |
| 9,077,522 B2 | 7/2015 | Woodruff |
| 2010/0014784 A1 | 1/2010 | Silverbrook et al. |
| 2012/0204026 A1 | 8/2012 | Shi et al. |
| 2012/0210435 A1 | 8/2012 | Niemela |
| 2012/0323794 A1 | 12/2012 | Livshits |
| 2013/0212690 A1 | 8/2013 | Fawaz et al. |
| 2013/0282733 A1 * | 10/2013 | Tawakol ........... G06F 17/30867 707/748 |
| 2014/0040172 A1 | 2/2014 | Ling et al. |
| 2014/0041049 A1 | 2/2014 | Aggarwal et al. |
| 2014/0281572 A1 | 9/2014 | Wang et al. |
| 2015/0236849 A1 | 8/2015 | Ayday et al. |
| 2015/0268999 A1 | 9/2015 | Buendgen et al. |
| 2016/0253710 A1 * | 9/2016 | Publicover ............. H04W 4/21 705/14.66 |

OTHER PUBLICATIONS

Aggarwal, C., et al., "A Survey of Randomization Methods for Privacy-Preserving Data Mining," Advances in Database Systems, vol. 34, 2008, pp. 137-156.

Bertino, E., et al., "A Framework for Evaluating Privacy Preserving Data Mining Algorithms," Data Mining and Knowledge Discovery, vol. 11, Issue 2, Sep. 2005, pp. 121-154.

Foreign Communication From a Related Counterpart Application, PCT Application No. PCT/KR2016/011597, International Search Report dated Jan. 19, 2017, 3 pages.

Foreign Communication From a Related Counterpart Application, PCT Application No. PCT/KR2016/011597, Written Opinion dated Jan. 19, 2017, 4 pages.

Supplementary European Search Report dated Aug. 21, 2018 in connection with European Patent Application No. 16 85 5796, 8 pages.

* cited by examiner

SYSTEM AND METHOD FOR PRIVACY MANAGEMENT OF INFINITE DATA STREAMS

CROSS-REFERENCE TO RELATED APPLICATION AND CLAIM OF PRIORITY

This application claims priority under 35 U.S.C. § 119(e) to U.S. Provisional Patent Application No. 62/241,632 filed on Oct. 14, 2015, title "PRIVATE ANALYSIS OF INFINITE DATA STREAMS." The above-identified provisional patent application is hereby incorporated by reference in its entirety.

TECHNICAL FIELD

This disclosure relates generally to data processing and reporting. More specifically, this disclosure relates to infinite data streams privacy-preserving processing.

BACKGROUND

The fast deployment of various electronic devices, for example smart phones, internet of things (IoT) devices and sensors, has resulted in the continuous collection and monitoring of various types of information. The capability of collecting, monitoring, analyzing and consuming such streaming information has been a key driving force for different services. For example, for smart TV manufacturers, it has been beneficial to continuously share aggregated user data (in different forms of data summaries) with business partners and third-party service providers in order to provide adds-on services and increase revenue. As another example, it has been a common practice for sensors to continuously collect users' data in order to better personalized services.

SUMMARY

This disclosure provides privacy-preserving processing of infinite data streams.

In a first embodiment, an apparatus provides for preserving streaming data anonymity. The apparatus includes a memory configured to store streaming data with a first data set and at least one processor operably connected to the memory. The at least one processor transforms the first data set to a second data set based on a difference level for preserving differential privacy of the first data set. Where to transform the first data set, the processor determines whether the difference level exceeds a difference threshold. The at least one processor transforms the first data set by adding a first noise when the difference level exceeds the difference threshold. When the difference level does not exceed the difference threshold, the at least one processor determines whether a retroactive count is greater than a retroactive count threshold. The at least one processor transforms the first data set by adding a second noise when the retroactive count is greater than the retroactive count threshold. The at least one processor transforms the first data set by adding a third noise when the retroactive count is not greater than the retroactive count threshold. The at least one processor transmits the second data set to a data processing system for statistic based services.

In a second embodiment, a method provides for preserving streaming data anonymity. The method includes storing streaming data comprising a first data set. The method also includes transforming the first data set to a second data set based on a difference level for preserving differential privacy of the first data set. To transform the first data set, the method includes determining whether the difference level exceeds a difference threshold and transforming the first data set by adding a first noise when the difference level exceeds the difference threshold. When the difference level does not exceed the difference threshold, the method further includes determining whether a retroactive count is greater than a retroactive count threshold. The method further includes transforming the first data set by adding a second noise when the retroactive count is greater than the retroactive count threshold, and transforming the first data set by adding a third noise when the retroactive count is not greater than the retroactive count threshold. The method then includes transmitting the second data set to a data processing system for statistic based services.

In a third embodiment, a non-transitory medium embodying a computer program provides for preserving streaming data anonymity. The computer readable program code that when executed causes at least one processing device to store streaming data comprising a first data set. The computer readable program code that when executed also causes at least one processing device to transform the first data set to a second data set based on a difference level for preserving differential privacy of the first data set. To transform the first data set, the computer readable program code that when executed causes at least one processing device to determine whether the difference level exceeds a difference threshold and transform the first data set by adding a first noise when the difference level exceeds the difference threshold. When the difference level does not exceed the difference threshold, the computer readable program code that when executed further causes at least one processing device to determine whether a retroactive count is greater than a retroactive count threshold. The computer readable program code that when executed further causes at least one processing device to transform the first data set by adding a second noise when the retroactive count is greater than the retroactive count threshold, and transform the first data set by adding a third noise when the retroactive count is not greater than the retroactive count threshold. The computer readable program code that when executed then causes at least one processing device to transmit the second data set to a data processing system for statistic based services.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 10, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

In a data sharing process, user privacy issues have raised substantial public concerns. Users have explicitly expressed their unwillingness to share data without proper privacy control. The current on-and-off privacy control mechanism used by most service providers simply repels privacy-conscious users from receiving certain services. This disclosure explores a middle ground between on and off privacy control mechanisms.

Solutions for privacy-preserving streaming data analysis have noticeable limitations towards practical applications. Some techniques only consider computing the running sum of 1's over an overly simplified stream of 0's and 1's. Other techniques only work for data streams with a limited predetermined time duration and are not able to provide desirable accuracy over a long period of time. Moreover, the prediction-based nature makes the resultant accuracy instable on real-life data.

Certain embodiments describe a method and system that continuously anonymize streaming data collected from individual user devices or sensors. Distorted data summaries are regularly released to third-party service providers with provable privacy guarantee while allowing the user to receive uninterrupted services, which benefits include: helping the data publishers stay clear of law suits and increasing revenue by engaging more privacy-conscious users. A data publisher refers to a party that holds some data and needs to share the data with a third party. For example, SAMSUNG SMART TV server, which collects logs from SAMSUNG SMART TVs and publishes some aggregated statistics to a third party, which is a data publisher.

Various embodiments of the present disclosure provide novel privacy-preserving streaming data sharing solutions to support diverse services while protecting user privacy against untrusted service providers. Certain embodiments receive continuous user participation data or sensor data, generate the corresponding data summaries, determine the difference level of consecutive data summaries, and accordingly send distorted summaries on a regular basis, not limited by time constraint.

Embodiments of the present invention are, for example, able to: (1) support arbitrary user participation data and generic data summary structures; (2) regularly generate distorted summaries not limited by time constraint; and (3) provide consistently high-quality distorted summaries.

Figure 1:
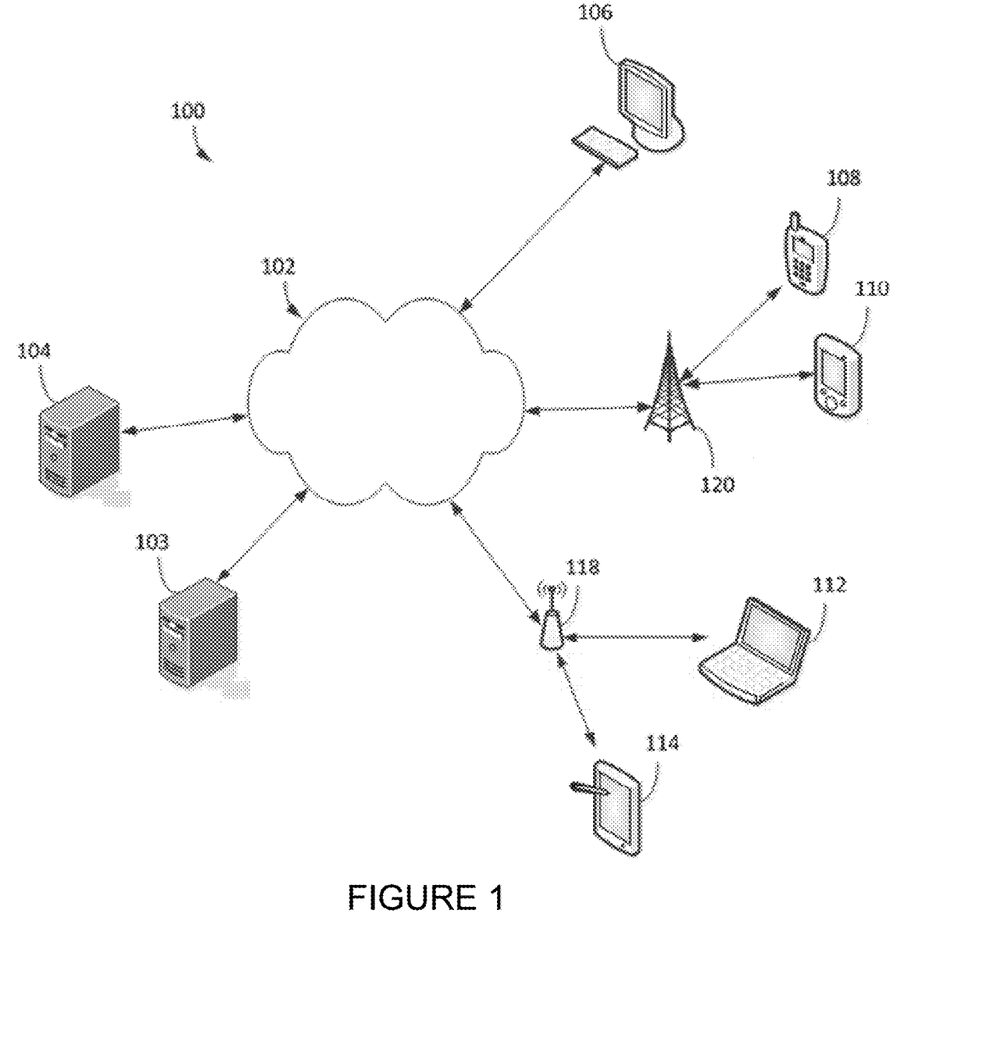
FIG. 1 illustrates an example communication system in which various embodiments of the present disclosure may be implemented.

FIG. 1 illustrates an example communication system 100 in which various embodiments of the present disclosure may be implemented. The embodiment of the communication system 100 shown in FIG. 1 is for illustration only. Other embodiments of the communication system 100 could be used without departing from the scope of this disclosure.

As shown in FIG. 1, the system 100 includes a network 102, which facilitates communication between various components in the system 100. For example, the network 102 may communicate Internet Protocol (IP) packets, frame relay frames, or other information between network addresses. The network 102 may include one or more local area networks (LANs); metropolitan area networks (MANs); wide area networks (WANs); all or a portion of a global network, such as the Internet; or any other communication system or systems at one or more locations.

The network 102 facilitates communications between various servers 103 and 104 and various electronic devices 106-114. Each server 104 includes any suitable computing or processing device that can provide computing services for one or more electronic devices. Each server 104 could, for example, include one or more processors, one or more memories storing instructions and data, and one or more network interfaces facilitating communication over the network 102.

Each electronic device 106-114 represents any suitable computing or communication device that interacts with at least one server or other computing device(s) over the network 102. In this example, the electronic devices 106-114 include electronic devices, such as, for example, a desktop computer 106, a mobile telephones or smartphones 108, a personal digital assistant (PDA) 110, a laptop computer 112, a tablet computer 114, a headset, a wearable device, smart watch, etc. However, any other or additional electronic devices could be used in the communication system 100.

In this example, some electronic devices 108-114 communicate indirectly with the network 102. For example, the electronic devices 108-110 communicate via one or more base stations 120, such as cellular base stations or eNodeBs. Also, the electronic devices 112-114 communicate via one or more wireless access points (APs) 118, such as IEEE 802.11 wireless APs, Bluetooth, and WiFi direct. Note that these are for illustration only and that each electronic device could communicate directly with the network 102 or indirectly with the network 102 via any suitable intermediate device(s) or network(s).

As described in more detail below, the server 103 or server 104 performs processes on an infinite data streams from a plurality of electronic devices 108-114. While the server 103 or server 104 is described as performing privacy-preserving processing on an infinite data stream, devices 108-114 could also perform analysis on an infinite data stream from other devices 108-114 or sensors included in the various devices.

Although FIG. 1 illustrates one example of a communication system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
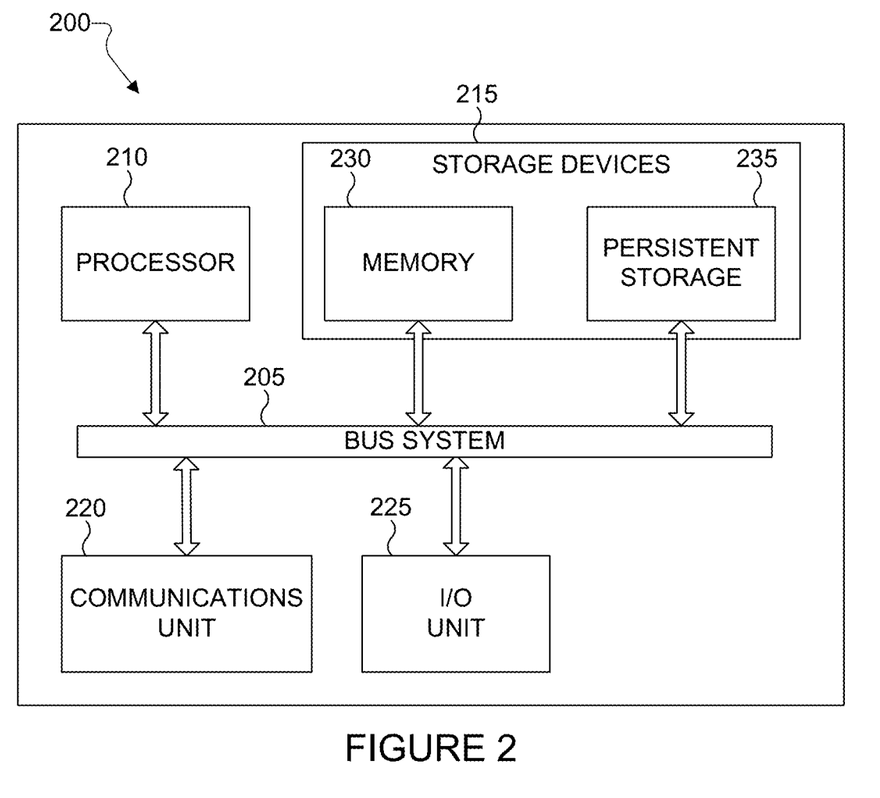
FIG. 2 illustrates an example server according to various embodiments of the present disclosure.
Figure 3:
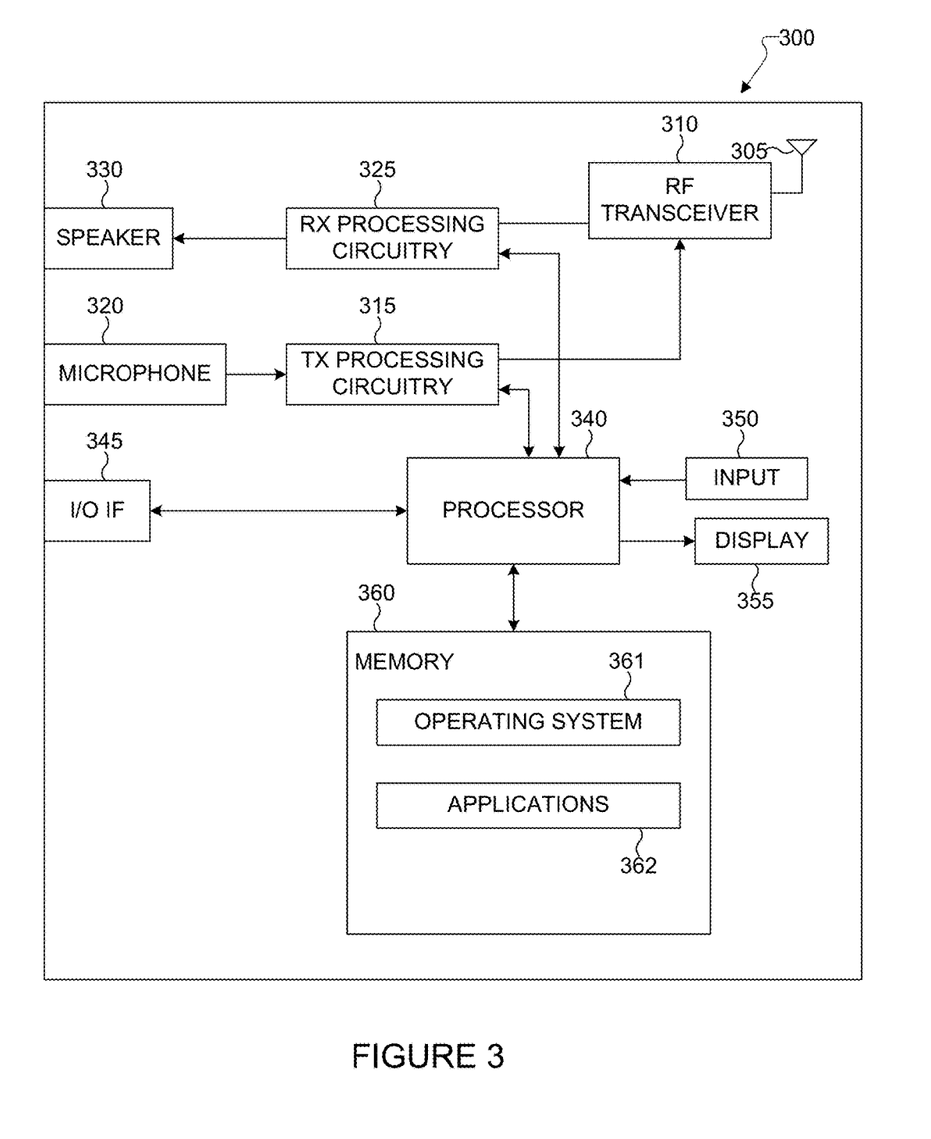
FIG. 3 illustrates an example electronic device according to various embodiments of the present disclosure.

FIGS. 2 and 3 illustrate example electronic devices in a communication system according to various embodiments of the present disclosure. In particular, FIG. 2 illustrates an example server 200, and FIG. 3 illustrates an example electronic device 300. The server 200 could represent the server 103 or the server 104 in FIG. 1, and the electronic device 300 could represent one or more of the client devices 106-114 in FIG. 1.

As shown in FIG. 2, the server 200 includes a bus system 205, which supports communication between at least one processor 210, at least one storage device 215, at least one communications unit 220, and at least one input/output (I/O) unit 225.

The processor 210 executes instructions that may be loaded into a memory 230. The processor 210 may include any suitable number(s) and type(s) of processors or other devices in any suitable arrangement. Example types of processor 210 include microprocessors, microcontrollers, digital signal processors, field programmable gate arrays, application specific integrated circuits, and discreet circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, flash memory, or optical disc.

The communications unit 220 supports communications with other systems or devices. For example, the communications unit 220 could include a network interface card or a wireless transceiver facilitating communications over the network 102. The communications unit 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

Note that while FIG. 2 is described as representing the server 104 of FIG. 1, the same or similar structure could be used in one or more of the client devices 106-114. For example, a laptop or desktop computer could have the same or similar structure as that shown in FIG. 2.

As described in more detail below, the communications unit 220 continually receives a plurality of data streams into a storage device 215, each from a different electronic device 108-114. The server 200 uses the processor 210 to perform privacy-preserving processing of the infinite data streams in current time for a sampling size.

As shown in FIG. 3, the electronic device 300 includes an antenna 305, a radio frequency (RF) transceiver 310, transmit (TX) processing circuitry 315, a microphone 320, and receive (RX) processing circuitry 325. The electronic device 300 also includes a speaker 330, a processor 340, an input/output (I/O) interface (IF) 345, an input 350, a display 355, and a memory 360. The memory 360 includes an operating system (OS) program 361 and one or more applications 362.

The RF transceiver 310 receives, from the antenna 305, an incoming RF signal transmitted by another component in a system. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processors and execute the OS program 361 stored in the memory 360 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS program 361 or in response to signals received from external devices or an operator. The processor 340 is also coupled to the I/O interface 345, which provides the electronic device 300 with the ability to connect to other devices such as laptop computers and handheld computers. The I/O interface 345 is the communication path between these accessories and the processor 340.

The processor 340 is also coupled to the input 350 and the display 355. The operator of the electronic device 300 can use the input 350 (e.g., keypad, touchscreen, button etc.) to enter data into the electronic device 300. The display 355 may be a liquid crystal display, a light-emitting diode (LED) display, an optical LED (OLED), an active matrix OLED (AMOLED), or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

As described in more detail below, the transceiver 310 continually receives a plurality of data streams into a memory 360, each from a different electronic device 300 or different electronic device 108-114. The electronic device 300 performs privacy-preserving processing of the infinite data streams in current time for a sampling size. In certain embodiments, the electronic device 300 transmits a continuous stream of data for privacy-preserving processing.

Although FIGS. 2 and 3 illustrate examples of devices in a communication system, various changes may be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the electronic device 300 configured as a mobile telephone or smartphone, electronic devices could be configured to operate as other types of mobile or stationary devices. In addition, as with computing and communication networks, electronic devices and servers can come in a wide variety of configurations, and FIGS. 2 and 3 do not limit this disclosure to any particular electronic device or server.

Figure 4:
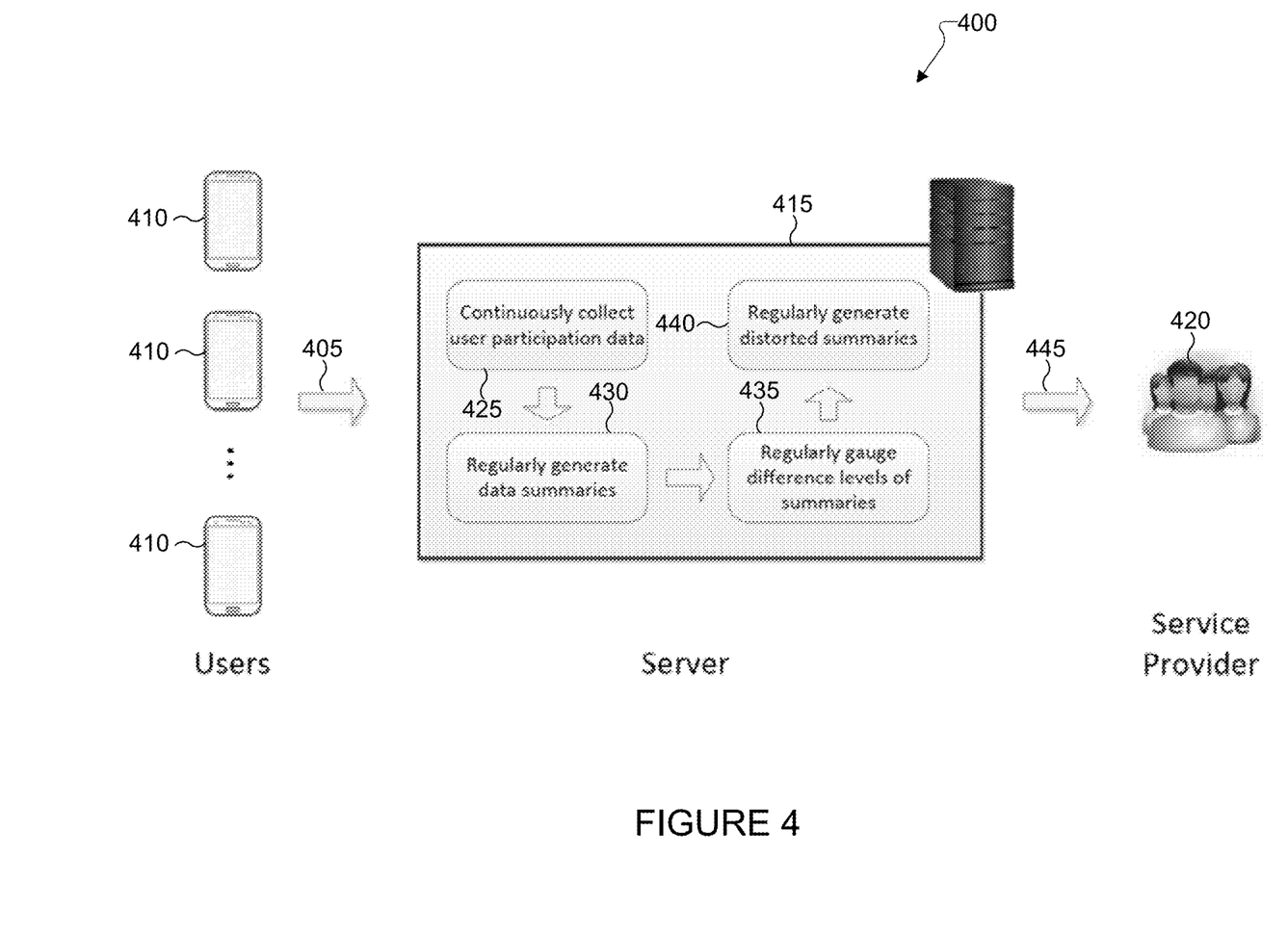
FIG. 4 illustrates an example system architecture for privacy-preserving processing of infinite data streams according to various embodiments of the present disclosure.

FIG. 4 illustrates an example system architecture 400 for privacy-preserving processing of infinite data streams 405 according to various embodiments of the present disclosure. The embodiment of the system architecture 400 illustrated in FIG. 4 is for illustration only. FIG. 4 does not limit the scope of this disclosure to any particular implementation of an electronic device.

The system architecture 400 includes a plurality of user devices 410, a first device 415 and at least one service provider 420. The user devices 410 continuously collect data related to the operation of each respective user device 410 and transmit a data stream to the first device 415 for privacy-preserving processing. The first device 415 processes the data streams 405 and generates distorted summaries 445 for providing to the service providers 420. The distorted summaries 445 provide enough value in the distorted summaries 445 for the service providers 420, while protecting the events participated by the individual user devices 410.

In operation 425, the first device 410 (e.g., an electronic device 300 or a server 200) continuously collects data streams 405 comprising one or more user participation data or sensor data from a plurality of user devices 415. In operation 430, the first device 410 converts the collected data into more compact data summaries (e.g., histograms) that represent the overall participation data or sensor data of an event for a certain time period and that are useful for untrusted third-party service providers 420. In operation 435, the first device 415 calculates the difference level between consecutive data summaries by automatically selecting the sampling rate that maximizes accuracy. In operation 440, the first device 415, based on the difference level, takes proper strategies to distort and release data summaries on a regular basis not limited by time constraint. If the difference level is within a threshold, the distorted summary remains unchanged from the previous distorted summary.

The distorted data summaries released are guaranteed to satisfy differential privacy and prevent the discovery of a user's participation data or sensor data. Embodiments of the present disclosure guarantee that the distorted data summaries provide stable quality that is consistent with the original summaries over time.

Although FIG. 4 illustrates an example system architecture 400 for privacy-preserving processing of infinite data streams, various changes may be made to FIG. 4. For example, various components in FIG. 4 could be combined, further subdivided, or omitted and additional components could be added according to particular needs. As with computing and communication networks, system architecture 400 can come in a wide variety of configurations and FIG. 4 does not limit this disclosure to any particular electronic device.

Figure 5:
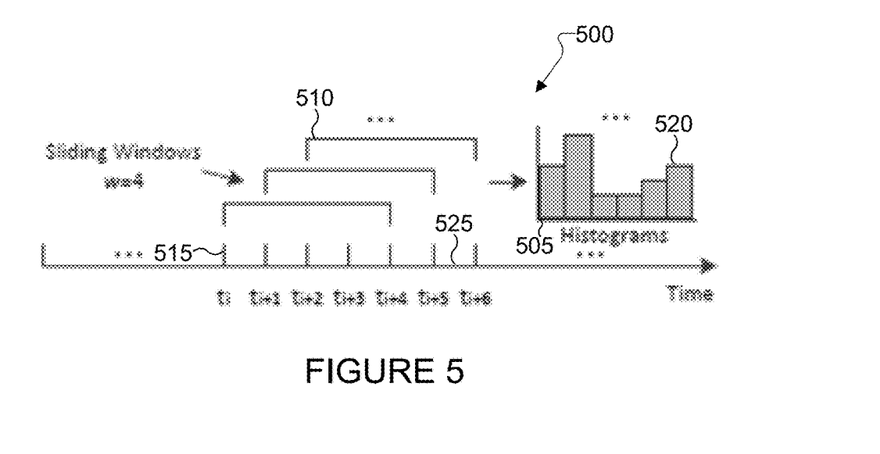
FIG. 5 illustrates an example for a sample data stream according to various embodiments of the present disclosure.

FIG. 5 illustrates an example for a sample data stream 500 according to various embodiments of the present disclosure. The embodiment of the sample data stream 500 illustrated in FIG. 5 is for illustration only. FIG. 5 does not limit the scope of this disclosure to any particular implementation of an electronic device.

Each event belongs to a user and is associated with an attribute value. The attribute value, for example, can be a program watched by a user, a step count reported by a smart watch, a reading from a sensor, etc. The first device 410 continuously monitors the data stream 405 and publishes histograms 505 summarizing the event distributions in the latest sliding windows 510 at discrete timestamps 515. Histograms 505 have wide applications in a broad spectrum related to different aspects of interest for service providers. Each bin 520 in a histogram 505 corresponds to an attribute value, and its count is the number of events falling into a bin within the sliding window. The time duration between two consecutive timestamps forms a time unit 525. The size of a sliding window is the number of time units it covers.

Although FIG. 5 illustrates an example sample data stream 500, various changes may be made to FIG. 5. For example, various components in FIG. 5 could be combined, further subdivided, or omitted and additional components could be added according to particular needs. As a particular example, the sliding windows 510 for a sample data stream 500 could be further divided to include more time units 525. In addition, as with computing and communication networks, sample data stream 500 can come in a wide variety of configurations and FIG. 5 does not limit this disclosure to any particular electronic device.

Figure 6:
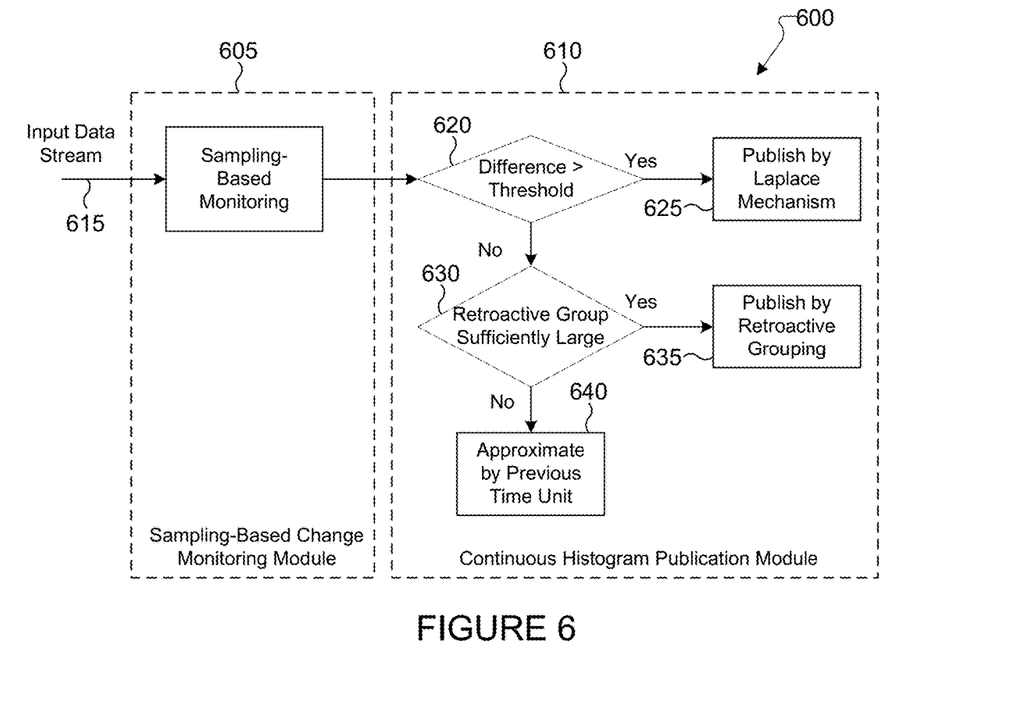
FIG. 6 illustrates an example workflow for privacy-preserving processing of infinite data streams for television data sharing according to various embodiments of the present disclosure.

FIG. 6 illustrates an example workflow 600 for privacy-preserving processing of infinite data streams for participation data sharing according to various embodiments of the present disclosure. The embodiment of the workflow 600 illustrated in FIG. 6 is for illustration only. FIG. 6 does not limit the scope of this disclosure to any particular implementation of an electronic device.

An exemplary system of the present disclosure includes a sampling-based change monitoring module 605 and a continuous histogram publication module 610. The sampling-based change monitoring module 605 adaptively determines the best sampling rates to learn the underlying stream's evolution, based on which the latter takes proper publishing strategies to improve utility (i.e., reduce error).

The sampling-based change monitoring module 605 summarizes user participation data from the input data stream 615 in the current time unit and calculates the proper sampling rate $\gamma_j$ by solving the following optimization problem:

$$\underset{\gamma_j}{\text{minimize}} \quad \frac{N_j(1-\gamma_j)}{\gamma_j} + \frac{2\gamma_j^2}{(\ln(e^{\varepsilon_1} - 1 + \gamma_j) - \ln\gamma_j)^2}$$

$$\text{subject to } 0 < \gamma_j \leq 1$$

where $N_j$ is the true user participation data, and $\varepsilon_1$ is the privacy parameter used in the sampling-based change monitoring module 605. Second, the sampling-based change monitoring module 605 generates the sample with the sampling rate $\gamma_j$ and estimates the user participation data as $$\tilde{N}_j = \frac{|S_j| + Lap\left(\frac{1}{l\ln(e^{\varepsilon_1} - 1 + \gamma_j) - \ln\gamma_j n}\right)}{\gamma_j}$$

where $|S_j|$ is the true sample size and Lap(·) is the Laplace mechanism. In the last step, the sampling-based change monitoring module 605 calculates the squared error between the current time unit and the previous time unit.

In general, the continuous histogram publication module 610 achieves error reduction by maintaining a set of time units 525 called a retroactive group. In operation 620, the continuous histogram publication module 610 compares the difference (i.e., the squared error) computed by the sampling-based change monitoring module 605 with the threshold $2/(\varepsilon_2)^2$, where $\varepsilon_2$ is privacy parameter for the continuous histogram publication module 610. In operation 625, if the difference is greater than or equal to $2/(\varepsilon_2)^2$, the continuous histogram publication module 610 publishes the user participation data by the Laplace mechanism and empties the retroactive group. Otherwise, in operation 630, the continuous histogram publication module 610 examines whether it is possible to reduce error by retroactive grouping. In operation 635, if the size of the retroactive group is greater than or equal to $2/(\gamma\varepsilon_2)$, where $\gamma$ is the scale of Laplace error added to the first time unit in the retroactive group, continuous histogram publication module 610 publishes the average of the time units in the retroactive group plus $Lap(1/(|G|\varepsilon_2))$, where |G| is the retroactive group size, and empties the retroactive group. In operation 640, if the size of the retroactive group is less than $2/(\gamma\varepsilon_2)$, the continuous histogram publication module 610 approximates the current time unit's data by that of the previous time unit and adds the current time unit to the retroactive group. For any infinite data stream, the workflow 600 gives $\varepsilon$-differential privacy, where $\varepsilon=\varepsilon_1+\varepsilon_2$. For (a segment of) a data stream with T time units, the minimum average expected sum of squared error (SSE) is in $O/(1/(T(\varepsilon_2)^2))$.

Although FIG. 6 illustrates an example workflow 600 for privacy-preserving processing of infinite data streams for participation data sharing, various changes may be made to FIG. 6. For example, various components in FIG. 6 could be combined, further subdivided, or omitted and additional components could be added according to particular needs. As with computing and communication networks, workflow 600 can come in a wide variety of configurations and FIG. 6 does not limit this disclosure to any particular electronic device.

Figure 7:
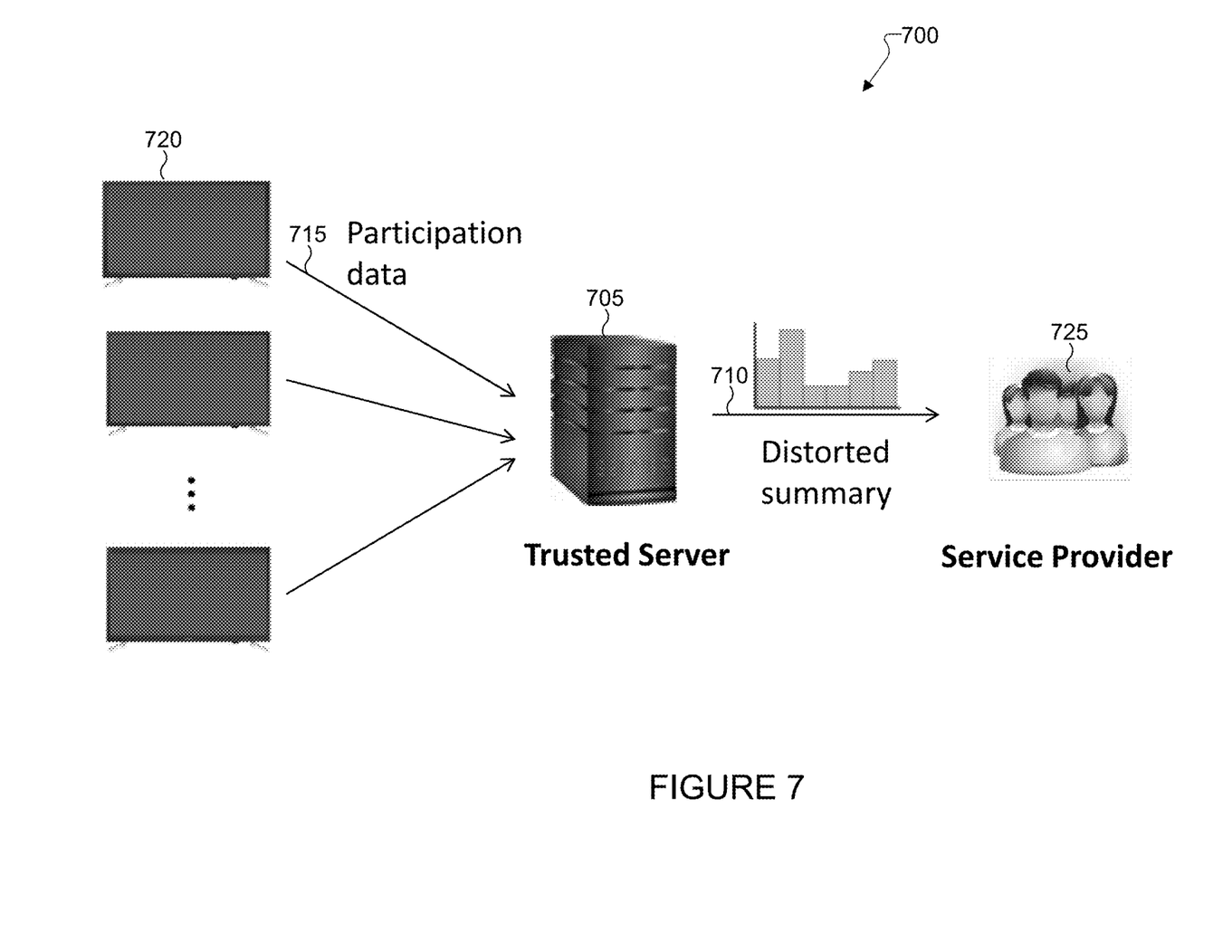
FIG. 7 illustrates an example electronic device for privacy-preserving processing of infinite data streams for television data sharing according to various embodiments of the present disclosure.

FIG. 7 illustrates an example electronic device 705 for privacy-preserving processing of infinite data streams for television data sharing 700 according to various embodiments of the present disclosure. The embodiment of the television data sharing 700 illustrated in FIG. 7 is for illustration only. FIG. 7 does not limit the scope of this disclosure to any particular implementation of an electronic device.

A first device 705 (e.g., a trusted server hosted by a smart TV manufacturer) can regularly share data summaries 710 (e.g., number of users watching each program) of participation data 715 from participants 720 to untrusted third party partners or service providers 725 for either recommendation or advertising services without intruding privacy of the participants 720. Participation data 715, for example, could include the program being watched by a user. The recommendations from the participation data could be the programs that the user may also like. The released summaries could also be used directly by a third party to determine the price of an advertisement.

Although FIG. 7 illustrates an example electronic device 705 for privacy-preserving processing of infinite data streams for television data sharing 700, various changes may be made to FIG. 7. For example, various components in FIG. 7 could be combined, further subdivided, or omitted and additional components could be added according to particular needs. As a particular example, the television data sharing 700 can come in a wide variety of configurations and FIG. 7 do not limit this disclosure to any particular electronic device.

Figure 8:
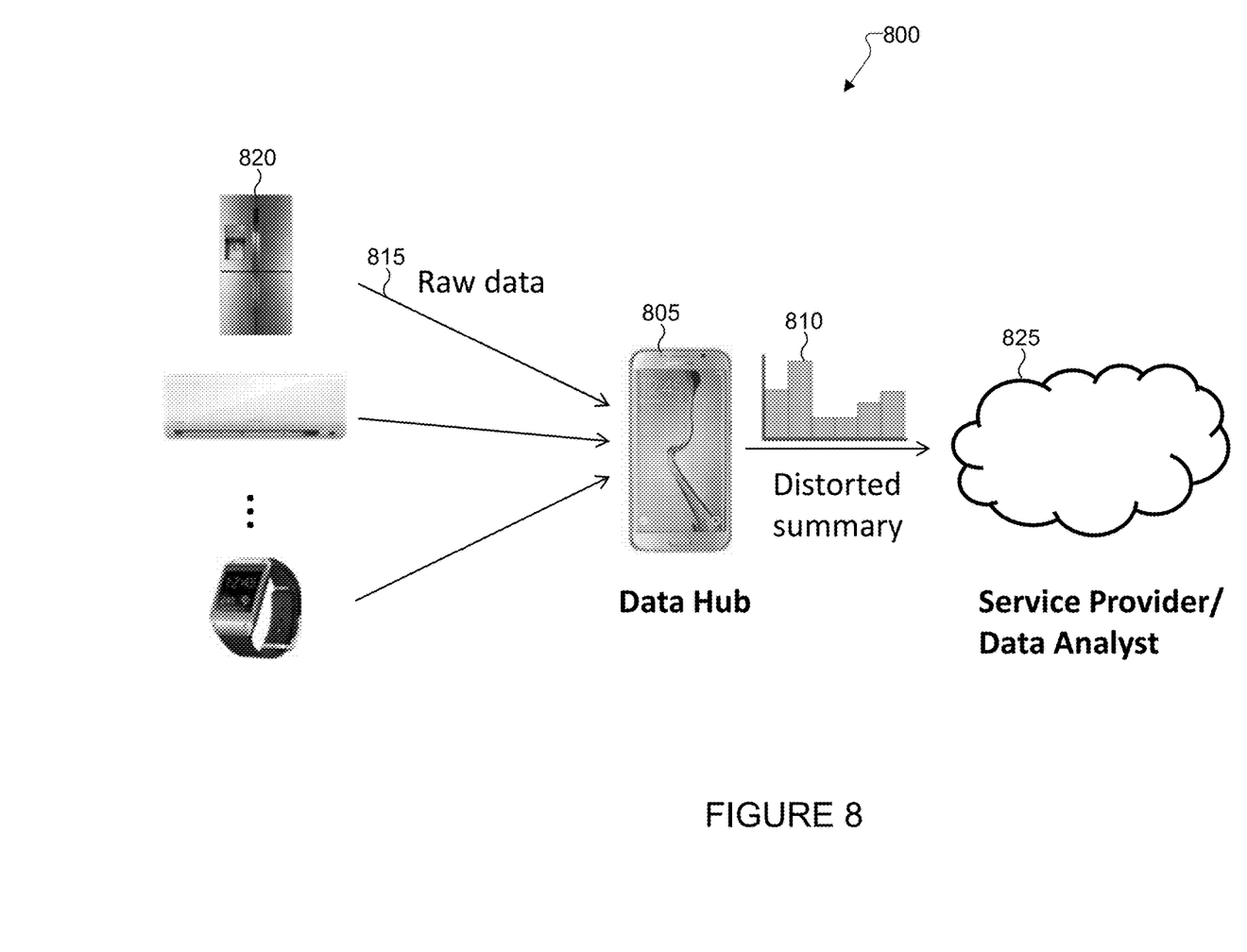
FIG. 8 illustrates an example electronic device for privacy-preserving processing of infinite data streams for other electronic device data sharing according to various embodiments of the present disclosure.

FIG. 8 illustrates an example electronic device 805 for privacy-preserving processing of infinite data streams for other electronic device data sharing 800 according to various embodiments of the present disclosure. The embodiment of the other electronic device data sharing 800 illustrated in FIG. 8 is for illustration only. FIG. 8 does not limit the scope of this disclosure to any particular implementation of an electronic device.

A first device 805 (e.g., a user' smart phone) can collect, distort and share data summaries 810 of IoT device data 815 from IoT devices 820 to untrusted data recipients 825 (e.g., service providers or data analysts) on a regular basis for personalized services. Users' privacy is protected as the raw data is properly distorted before it leaves the first device 805. Participation data could be, for example, as simple as a timestamp when a user interacts with these IoT devices 820, in order for a smart home system to automate operations for the user (e.g., operating the air conditioner before the user arrives home, turning off lights after the user leaves)

Although FIG. 8 illustrates an example electronic device 805 for privacy-preserving processing of infinite data streams for other electronic device data sharing 800, various changes may be made to FIG. 8. For example, various components in FIG. 8 could be combined, further subdivided, or omitted and additional components could be added according to particular needs. As a particular example, the other electronic device data sharing 800 can come in a wide variety of configurations and FIG. 8 does not limit this disclosure to any particular electronic device.

Figure 9:
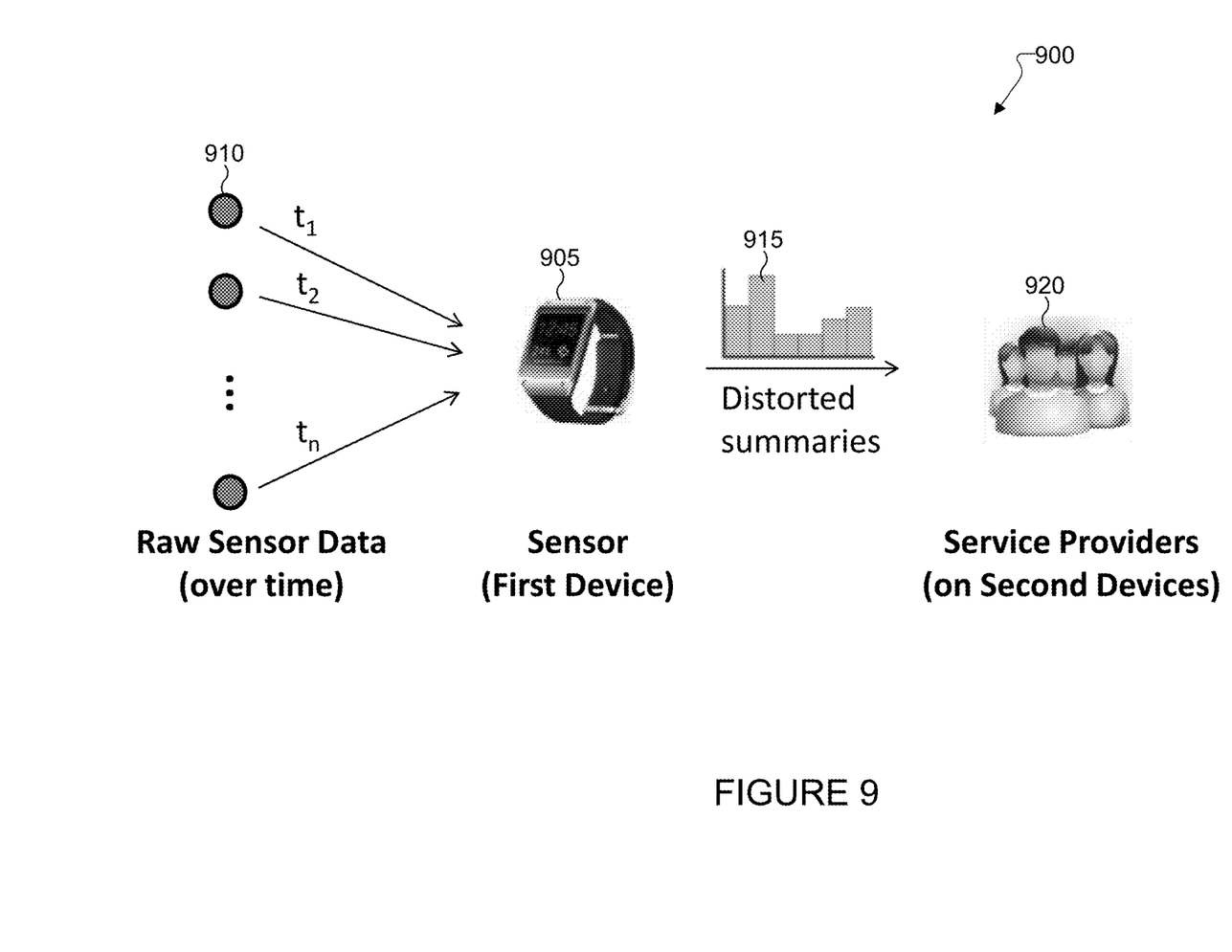
FIG. 9 illustrates an example electronic device for privacy-preserving processing of infinite data streams for sensor data sharing according to various embodiments of the present disclosure.

FIG. 9 illustrates an example electronic device 905 for privacy-preserving processing of infinite data streams for sensor data sharing 900 according to various embodiments of the present disclosure. The embodiment of the sensor data sharing 900 illustrated in FIG. 9 is for illustration only. FIG. 9 does not limit the scope of this disclosure to any particular implementation of an electronic device.

A first device 905 (e.g., SAMSUNG™ GEAR S2™) can continuously monitor, aggregate and anonymize sensor readings 910, and share the distorted data summaries 915 to an untrusted second device 920 either directly or via a data hub (e.g., the user's cellphone). In this way, the sensor data sharing 900 provides both a compact representation of a large number of sensor readings 910 that is easier for future services and saves on communication cost and privacy protection over users' personal sensor readings 910. Sensor readings, for example, could include any type of physiological measurement (e.g., temperature, heart rate, etc.). The corresponding service could generate the average of the user's cohort group so that the user is aware of whether his measurements are normal or average. For example, S-HEALTH™ provides reports with reference to the average performance of a user's age group.

Although FIG. 9 illustrates an example electronic device 905 for privacy-preserving processing of infinite data streams for sensor data sharing 900, various changes may be made to FIG. 9. For example, various components in FIG. 9 could be combined, further subdivided, or omitted and additional components could be added according to particular needs. As a particular example, the sensor data sharing 900 can come in a wide variety of configurations and FIG. 9 does not limit this disclosure to any particular electronic device.

Figure 10:
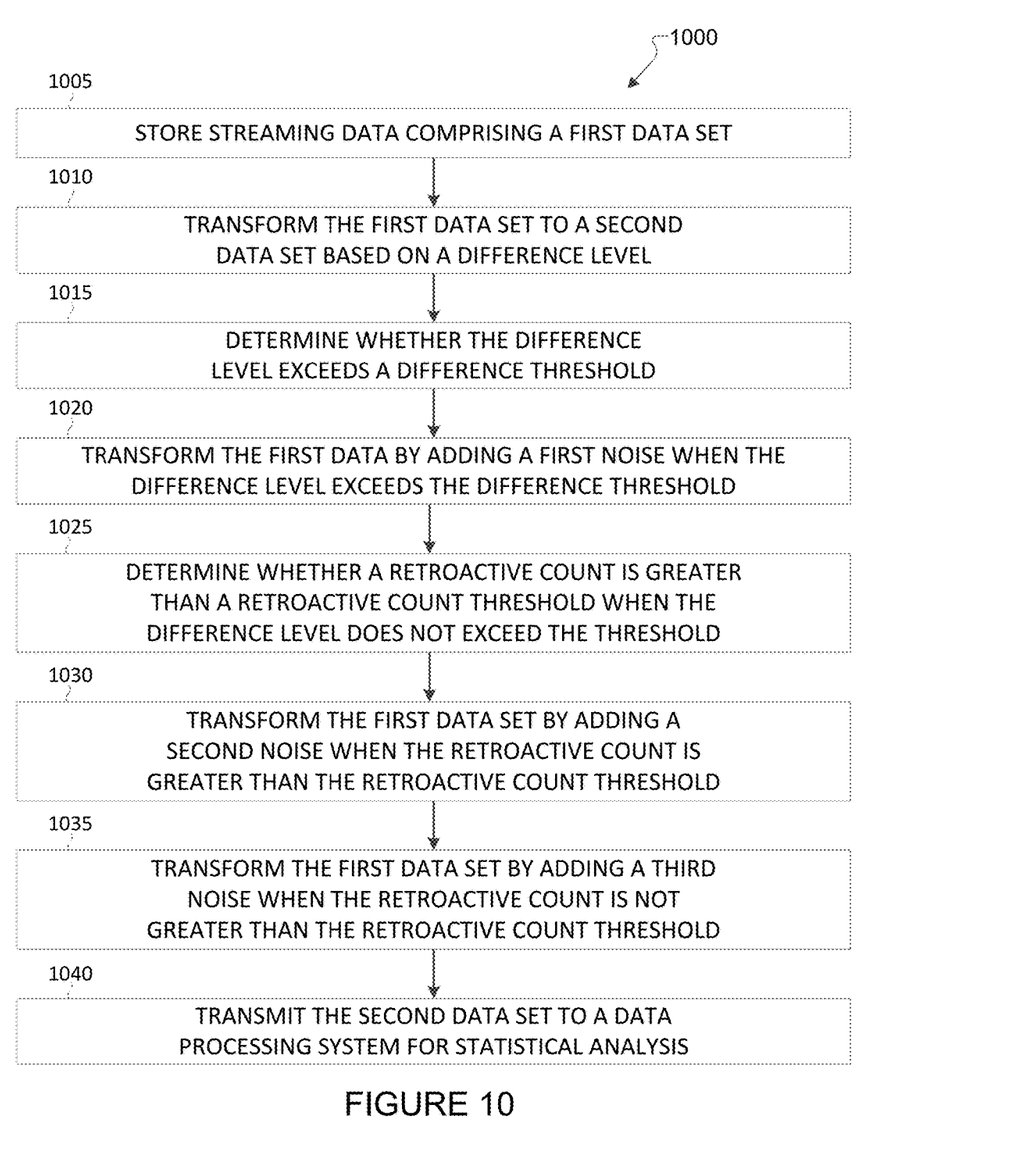
FIG. 10 illustrates an example process for privacy-preserving processing of infinite data structures according to various embodiments of the present disclosure.

FIG. 10 illustrates an example process 1000 for privacy-preserving processing of infinite data streams using an electronic device according to this disclosure. For example, the process 1000 depicted in FIG. 10 may be performed by server 200 in FIG. 2 or electronic device 300 in FIG. 3; the process may also be implemented by electronic devices 106-114 in FIG. 1.

In operation 1005, the electronic device 300 stores streaming data comprising a first data set. The electronic device 300 receives streaming data including the first data set from a plurality of sources. The first data set contains raw data from participant devices, IoT devices, or sensors from the electronic device 300. Examples of data sets include users watching a specific channel across a plurality of smart televisions, power usage across a plurality of IoT devices, or sensor readings, such as steps taken, from the electronic device 300.

The raw data set can tell much more about a user or group of users than is necessary for third parties. A profile of a specific user can be discovered by matching pieces of data from other or known databases to create identification markers. These markers can be used against confidential or secured databases to identify a specific individual in order to gain private details about a user. For example, a third party gets the raw data for steps taken for a participant. While the data appears innocent enough, the third party can interpret the raw data to possibly determine daily routines and patterns, such as when a participant is awake/asleep, active, away from home, etc.

User data received in the streaming data is summarized in current time. A sampling rate is calculated using the summarized user data. The electronic device 300 generates the first data set from the summarized user data using the sampling rate. The sampling rate of the data set can be determined based on a time interval.

In operation 1010, the electronic device 300 transforms the first data set to a second data set based on a difference level for preserving differential privacy of the first data set. Transforming the first data set includes operations 1015-1035. The difference level can be based on a comparison of a data statistic distribution of the first data set. The difference level can also be determined based on a comparison of the first data set with a previous data set from the plurality of data sources.

In operation 1015, the electronic device 300 determines whether the difference level exceeds a difference threshold. The difference threshold is based on an error rate and sampling rate of the data set received.

In operation 1020, the electronic device 300 transforms the first data set by adding a first noise when the difference level exceeds the threshold. The first noise can be determined based on a Laplace mechanism. A Laplace mechanism creates a random addition to the variables to perturb the value in the data set without losing the true value for the service provider.

The electronic device performs operations 1025-1035 when the difference level does not exceed the threshold.

In operation 1025, the electronic device 300 determines whether a retroactive count is greater than a retroactive count threshold. The retroactive count can be based on a number of previously consecutive data sets transformed using a third noise. The retroactive group takes into account the previous values that are within the difference threshold to further secure the identities of individual users or devices.

In operation 1030, the electronic device 300 transforms the first data set by adding a second noise when the retroactive count is greater than the retroactive count threshold. The second noise can be determined by retroactive grouping. Retroactive grouping takes a sufficiently large group of previous readings and generates a noise based on the retroactive group.

In operation 1035, the electronic device 300 transforms the first data set by adding a third noise when the retroactive count is not greater than the retroactive count threshold. The third noise can be determined based on approximating a noise based on the values of the previous consecutive time units.

In operation 1040, the electronic device 300 transmits the second data set to a data processing system for statistics based services. The second dataset can be generated as a distorted histogram. The distorted histogram functions to ensure the privacy of the participants, while providing direct knowledge of usage statistics or a group of devices.

Although FIG. 10 illustrates an example process for privacy-preserving processing of infinite data streams, respectively, various changes could be made to FIG. 10. For example, while shown as a series of steps, various steps could overlap, occur in parallel, occur in a different order, occur multiple times, or not be performed in certain embodiments.

None of the description in this application should be read as implying that any particular element, step, or function is an essential element that must be included in the claim scope. The scope of patented subject matter is defined only by the claims. Moreover, none of the claims is intended to invoke 35 U.S.C. §112(f) unless the exact words "means for" are followed by a participle.

What is claimed is:

1. An apparatus for preserving streaming data anonymity, the apparatus comprising:
   a physical memory configured to store data streams of user data; and
   at least one hardware processor operably connected to the physical memory, the at least one hardware processor configured to:
      continuously collect the data streams of the user data comprising participation data or sensor data from a plurality of user devices;
      convert the user data into a data summary that represents the participation data or the sensor data for a certain time period;
      transform the data summary to a distorted summary based on a difference level for preserving differential privacy of the user data, wherein to transform the data summary, the hardware processor is configured to:
         determine whether the difference level between the data summary and a previous data summary exceeds a difference threshold;
         transform the data summary to the distorted summary by adding a first noise when the difference level exceeds the difference threshold;
         when the difference level does not exceed the difference threshold:
            determine whether a retroactive count of the data summary is greater than a retroactive count threshold,
            transform the data summary to the distorted summary by adding a second noise when the retroactive count is greater than the retroactive count threshold, and
            transform the data summary to the distorted summary by adding a third noise when the retroactive count is not greater than the retroactive count threshold; and
      transmit the distorted summary to a data processing system for statistic based services.

2. The apparatus of claim 1, wherein the at least one hardware processor is further configured to determine the difference level based on a comparison of a data statistic distribution of the data summary.

3. The apparatus of claim 1, wherein the at least one hardware processor is further configured to determine the retroactive count based on a number of previously consecutive data summaries transformed using the third noise.

4. The apparatus of claim 3, wherein the at least one hardware processor is further configured to summarize the user data received in the data streams in a current time.

5. The apparatus of claim 4, wherein the at least one hardware processor is further configured to:
   calculate a sampling rate using the summarized user data; and
   generate the data summary from the summarized user data using the sampling rate.

6. The apparatus of claim 1, wherein the at least one hardware processor is further configured to determine the difference level based on comparison of the data summary with a previous data set from a plurality of data sources.

7. The apparatus of claim 1, wherein the data summary is a histogram including bins corresponding to a number of events falling into the bin within a sliding window.

8. A method comprising:
   continuously collecting, by a first device, data streams of user data comprising participation data or sensor data from a plurality of user devices;
   convert the user data into a data summary that represents the participation data or the sensor data for a certain time period;
   transforming the data summary to a distorted summary based on a difference level for preserving differential privacy of the user data, wherein to transform the data summary comprises:
      determining whether the difference level between the data summary and a previous data summary exceeds a difference threshold;
      transforming the data summary to the distorted summary by adding a first noise when the difference level exceeds the difference threshold;
      when the difference level does not exceed the difference threshold:
         determining whether a retroactive count of the data summary is greater than a retroactive count threshold,
         transforming the data summary to the distorted summary by adding a second noise when the retroactive count is greater than the retroactive count threshold, and
         transforming the data summary to the distorted summary by adding a third noise when the retroactive count is not greater than the retroactive count threshold; and
   transmitting the distorted summary to a data processing system for statistic based services.

9. The method of claim 8, further comprising determining the difference level based on a comparison of a data statistic distribution of the data summary.

10. The method of claim 8, further comprising determining the retroactive count based on a number of previously consecutive data summaries transformed using the third noise.

11. The method of claim 10, further comprising summarizing the user data received in the data streams in a current time.

12. The method of claim 11, further comprising:
   calculating a sampling rate using the summarized user data; and
   generating the data summary from the summarized user data using the sampling rate.

13. The method of claim 8, further comprising determining the difference level based on comparison of the data summary with a previous data set from a plurality of data sources.

14. The method of claim 8, data summary is a histogram including bins corresponding to a number of events falling into the bin within a sliding window.

15. A non-transitory computer readable medium embodying a computer program, the computer program comprising computer readable program code that when executed causes at least one processing device to:
continuously collect data streams of user data comprising participation data or sensor data from a plurality of user devices;
convert the user data into a data summary that represents the participation data or the sensor data for a certain time period;
transform the data summary to a distorted summary based on a difference level for preserving differential privacy of the user data, wherein to transform the data summary, the computer readable program code that when executed causes at least one processing device to:
determine whether the difference level between the data summary and a previous data summary exceeds a difference threshold;
transform the data summary to the distorted summary by adding a first noise when the difference level exceeds the difference threshold;
when the difference level does not exceed the difference threshold:
determine whether a retroactive count of the data summary is greater than a retroactive count threshold,
transform the data summary to the distorted summary by adding a second noise when the retroactive count is greater than the retroactive count threshold, and
transform the data summary to the distorted summary by adding a third noise when the retroactive count is not greater than the retroactive count threshold; and
transmit the distorted summary to a data processing system for statistic based services.

16. The non-transitory computer readable medium of claim 15, wherein the computer readable program code that when executed causes at least one processing device to determine the difference level based on a comparison of a data statistic distribution of the data summary.

17. The non-transitory computer readable medium of claim 15, wherein the computer readable program code that when executed causes at least one processing device to determine the retroactive count based on a number of previously consecutive data summaries transformed using the third noise.

18. The non-transitory computer readable medium of claim 17, wherein the computer readable program code that when executed causes at least one processing device to summarize the user data received in the data streams in a current time.

19. The non-transitory computer readable medium of claim 18, wherein computer readable program code that when executed causes at least one processing device to:
calculate a sampling rate using the summarized user data; and
generate the data summary from the summarized user data using the sampling rate.

20. The non-transitory computer readable medium of claim 15, wherein the computer readable program code that when executed causes at least one processing device to determine the difference level based on comparison of the data summary with a previous data set from a plurality of data sources.

* * * * *